(12) United States Patent
Lee et al.

(10) Patent No.: US 8,660,696 B2
(45) Date of Patent: Feb. 25, 2014

(54) ROBOT AND METHOD FOR CONTROLLING THE SAME

(75) Inventors: Ji Hyo Lee, Yongin-si (KR); Woo Sup Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 12/654,161

(22) Filed: Dec. 11, 2009

(65) Prior Publication Data

US 2010/0168913 A1    Jul. 1, 2010

(30) Foreign Application Priority Data

Dec. 29, 2008    (KR) .......................... 10-2008-135458

(51) Int. Cl.
*B25J 19/04*    (2006.01)
*G06T 15/20*    (2011.01)

(52) U.S. Cl.
USPC .......................................... 700/259; 700/264

(58) Field of Classification Search
USPC ................. 700/246, 250–254, 258, 259, 264; 382/103, 106, 153, 154, 190, 195; 901/47
See application file for complete search history.

(56) References Cited

U.S. PATENT DOCUMENTS

| | | | |
|---|---|---|---|
| 6,804,683 B1 * | 10/2004 | Matsuzaki et al. ..................... 1/1 |
| 8,024,072 B2 * | 9/2011 | Park et al. ..................... 700/259 |
| 2005/0213818 A1 * | 9/2005 | Suzuki et al. ................. 382/190 |
| 2006/0126918 A1 * | 6/2006 | Oohashi et al. ............... 382/153 |
| 2007/0276541 A1 * | 11/2007 | Sawasaki ..................... 700/253 |
| 2008/0292180 A1 * | 11/2008 | Kobayashi et al. ........... 382/154 |
| 2009/0290758 A1 * | 11/2009 | Ng-Thow-Hing et al. ... 382/106 |

* cited by examiner

*Primary Examiner* — Jason Holloway
(74) *Attorney, Agent, or Firm* — Staas & Halsey LLP

(57) ABSTRACT

A robot and a method of controlling the same are disclosed. The robot determines a presence or absence of a non-registration object if a registered object is not present in a photographing area, obtains an object name by communicating with a user if the presence of the non-registration object is decided, and additionally registers the object name in a database. Therefore, the robot recognizes the non-registration object present in the photographing area.

19 Claims, 9 Drawing Sheets

ROBOT AND METHOD FOR CONTROLLING THE SAME

CROSS-REFERENCE TO RELATED APPLICATIONS

This application claims the benefit of Korean Patent Application No. 2008-0135458, filed on Dec. 29, 2008 in the Korean Intellectual Property Office, the disclosure of which is incorporated herein by reference.

BACKGROUND

1. Field

The present invention relates to a robot and a method of controlling the robot, and more particularly to a robot recognizing a non-registration object, and a method of controlling the robot.

2. Description of the Related Art

Generally, a robot is designed to automatically carry out a certain task or operation, such that it may act as a substitute of or to assist a human being in various fields. A variety of intelligent robots have been developed, for example, a household robot, a secretary robot, an entertainment robot, and so on. The capability of the intelligent robot to recognize an object is important to carry out a given task.

Typically, objects existing in an activity space of the robot are different in shape, format, and color. In order to command the robot to easily carry out a given task, there is a need for the robot to have the capability of recognizing various objects.

A variety of methods for giving the robot the capability of recognizing the object have been developed. One method pre-stores characteristic information of the object in the robot, and compares object information obtained from the robot with the other object information stored in the robot, such that it may recognize a registered object according to the result of the comparison. The other method trains the robot to recognize a desired object in order to register the desired object, such that it can register the object while moving in the activity space.

A conventional robot may pre-store information of an object to be recognized, or may recognize only the object registered by the training. Therefore, the conventional robot is unable to recognize a non-registered object, resulting in greater inconvenience in carrying out a smooth service. As a result, the conventional robot must carry out complicated procedures to recognize the non-registered object.

SUMMARY

Therefore, it is an aspect of the present invention to provide a robot for additionally registering a non-registered object contained in a photographing area, and a method for controlling the robot.

It is also an aspect of the present invention to provide a robot to additionally register a non-registration object by communicating with a user, and a method of controlling the robot.

Additional aspects and/or advantages of the invention will be set forth in part in the description which follows and, in part, will be apparent from the description, or may be learned by practice of the invention.

The foregoing and/or other aspects of the present invention are achieved by providing a robot including: an object-presence decision unit which determines a presence or absence of a non-registered object if a registered object is not present in a photographing area; and a human robot interface (HRI) module communicating with a user to register the non-registered object.

The robot may further include: a camera providing photographed data of the photographing area, in which the object-presence decision unit provides image data and distance data obtained from the camera.

The object-presence decision unit may include at least one object area detector, which determines a candidate object area where the candidate object may exist on the basis of the image data or the distance data.

The object-presence decision unit may include an object-area decision unit, which determines the presence of the candidate object according to a size of an overlap area among the candidate object areas determined by the object area detectors.

The object area detectors may include at least one detector detecting a candidate object area according to distance distribution appearing on the distance data and at least one detector detecting a candidate area according to characteristics appearing on the image data.

The at least one detector detecting the candidate object area on the basis of the distance data may convert three-dimensional (3D) distance data into two-dimensional (2D) distance data.

The at least one detector detecting the candidate object area on the basis of the image data may determine a candidate object area on the basis of an edge and closed curved surface detected from the image data.

The at least one detector detecting the candidate object on the basis of the image data may decide a position and area where characteristic data will be extracted from the image data, and determines a candidate object area according to a density of a characteristic vector extracted from the decided position and area.

The robot may further include: a database storing the registered object; and an object registration unit additionally registering the non-registered object in the database.

The HRI module may communicate with a user to recognize the non-registration object.

The robot may further include: a human robot interface (HRI) controller providing a name of the non-registration object obtained from the user.

The HRI module may communicate with the user using voice or movements.

The foregoing and/or other aspects of the present invention are also achieved by providing a method of controlling a robot including: determining a presence or absence of a registered object in a photographing area; determining a presence or absence of a non-registered object if determined the registered object is not present in the photographing area; and if the non-registration object is present in the photographing area, communicating with a user to register the non-registration object.

The determining of the presence or absence of the non-registered object may include: determining a plurality of candidate object areas, each of which may have the candidate object, on the basis of voice data or distance data; and determining the presence of the candidate object according to a size of an overlap area among the determined candidate object areas.

The method may further include: if the candidate object area is determined on the basis of the distance data, determining the candidate object areas according to distance distribution appearing on the distance data.

The method may further include: if the candidate object area is determined on the basis of the distance data, converting three-dimensional (3D) data into two-dimensional (2D) data.

The method may further include: if the candidate object area is determined on the basis of the image data, determining the candidate object areas according to an edge and closed curved surface detected from the image data.

The method may further include: determining a position and area where characteristic data will be extracted from the image data, and determining a candidate object area according to a density of a characteristic vector extracted from the determined position and area.

The operation of communicating with the user may use voice or movement to acquire a name of the non-registered object.

The registering of the non-registered object may include storing an object name and object characteristics obtained by the operation of communicating with the user in a database, such that the non-registered object may be registered.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
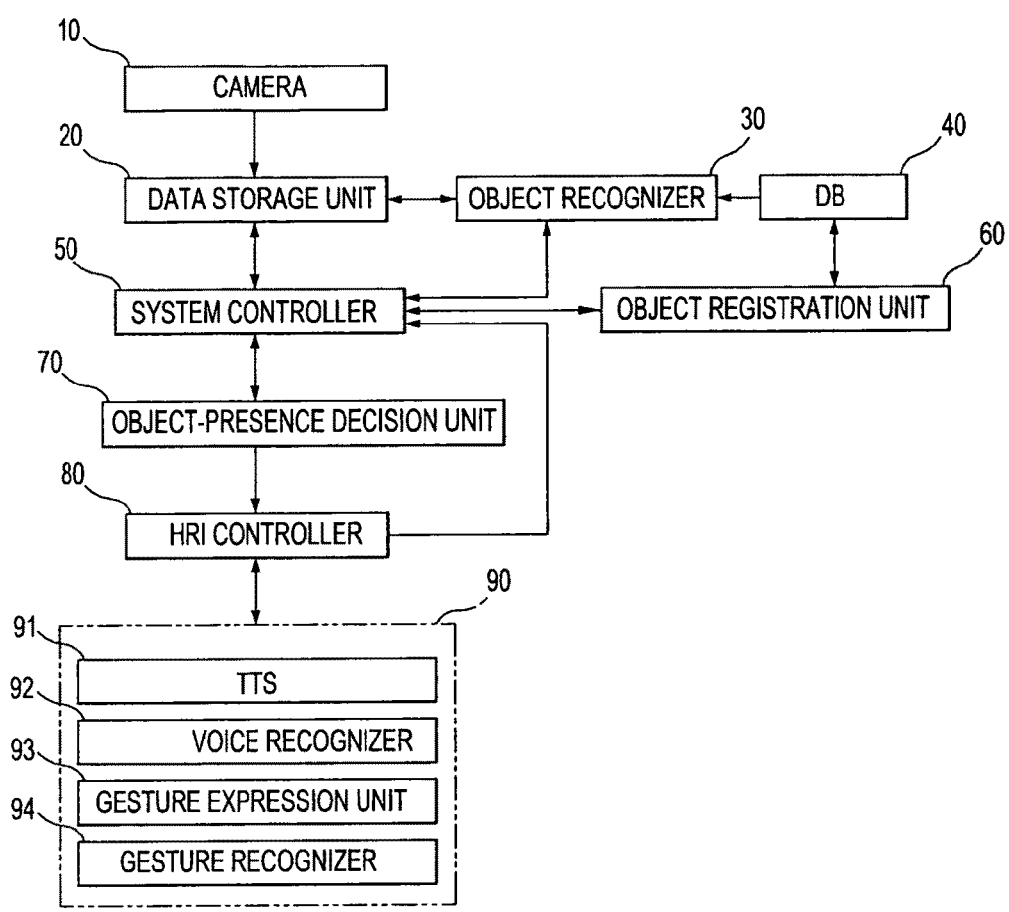
FIG. 1 is a control block diagram illustrating a robot according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

Referring to FIG. 1, a robot according to an embodiment of the present invention includes a camera 10 photographing a peripheral part of the robot. The camera 10 may use a stereo camera capable of photographing a three-dimensional (3D) image. Output data of the stereo camera is stored in a data storage unit 20. This output data may include an object image and distance information. In this case, the distance information may represent a distance from the camera to an object.

A database (DB) stores characteristic and name information of a registered object.

An object recognizer 30 extracts the characteristic information from data provided from the data storage unit 20, and compares the extracted characteristic information with the object information stored in the database (DB) 40. In other words, the object recognizer 30 extracts the extracted characteristic information and characteristic information of each object from the database (DB) 40, such that it may recognize a name of the object present in the DB using a recognition algorithm. If there is no information equal to information of the object present in the DB, the object recognizer 30 decides the absence of the registered object. This recognition result may be provided to a system controller 50.

The object registration unit 60 registers an object in the database (DB) 40. The object registration unit 60 registers characteristic and name information of an object to be registered in the database (DB) 40 upon receiving a control signal from the system controller 50.

If the object recognizer 30 decides the absence of the registered object in a photographing area of the camera 10, an object-presence decision unit 70 determines the presence or absence of a non-registered object (i.e., a candidate object) in the photographing area. Detailed descriptions of various methods for the above decision will hereinafter be described in detail.

If the candidate object is present in the photographing area, the object-presence decision unit 70 informs a human robot interface (HRI) controller 80 of the presence of the candidate object. Then, the HRI controller 80 communicates with a user through the medium of an HRI module 90.

In this case, contents of the communication between the HRI controller 80 and the user may include question-and-answer contents to recognize the name of the candidate object, such that a variety of intention expressions for the question-and-answer contents are needed for the HRI controller 80. The HRI module 90 may use at least one of a Text To Speech (TTS) 91, a voice recognizer 92, a gesture (motion) expression unit 93, and a gesture recognizer 94. In the case of asking the user the question, the HRI module 90 may use the TTS 91 to generate voice data of a text format. Contents spoken by the user are recognized by the voice recognizer 92. If any intention is expressed using hands or feet of the robot, the HRI module 90 may use the gesture expression unit 93. The gesture conducted by the user may be recognized by the gesture recognizer 94.

The HRI controller 80 may communicate with the user through the medium of the HRI module 90, such that a name of the object can be easily obtained. For example, the robot may point at a candidate object with its own hand, and at the same time may ask the user the name of the candidate object using an exemplary question generated from the TTS 91, for example, "What is this object?". In response to this question, the user speaks to the robot using a simple sentence "This is a cup". Therefore, the voice recognizer 92 is able to recognize a name of the candidate object by recognizing the voice of the user.

The HRI controller 80 transfers the name of the candidate object to a system controller 50. An object registration unit 60 may additionally register the name of the candidate object and characteristic information of the object in the database (DB) 40.

Detailed structures and operations of the object-presence decision unit 70 will hereinafter be described in detail.

Figure 2:
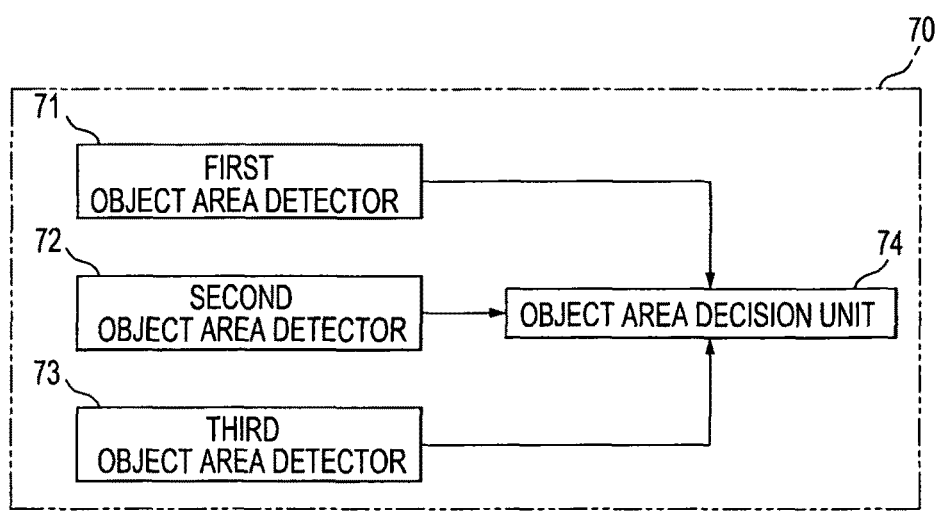
FIG. 2 is a block diagram illustrating an object-presence decision unit according to an embodiment of the present invention.

Referring to FIG. 2, the object-presence decision unit 70 may include a first object area detector 71, a second object area detector 72, a third object area detector 73, and an object area decision unit 74.

The first to third object area detectors 71 to 73 determine a candidate object area including the candidate object using individual detection methods. Then, the object area decision unit 74 determines the presence or absence of the candidate object in a photographing area according to the results of the individual detectors.

First, a method of commanding the first object area detector 71 to determine a candidate object area is as follows. According to this method, the first object area detector 71 receives three-dimensional (3D) data from a stereo camera, extracts areas having a similar depth distribution, and stores the extracted areas as the candidate object area. Detailed descriptions thereof will hereinafter be described in detail.

Figure 3A:
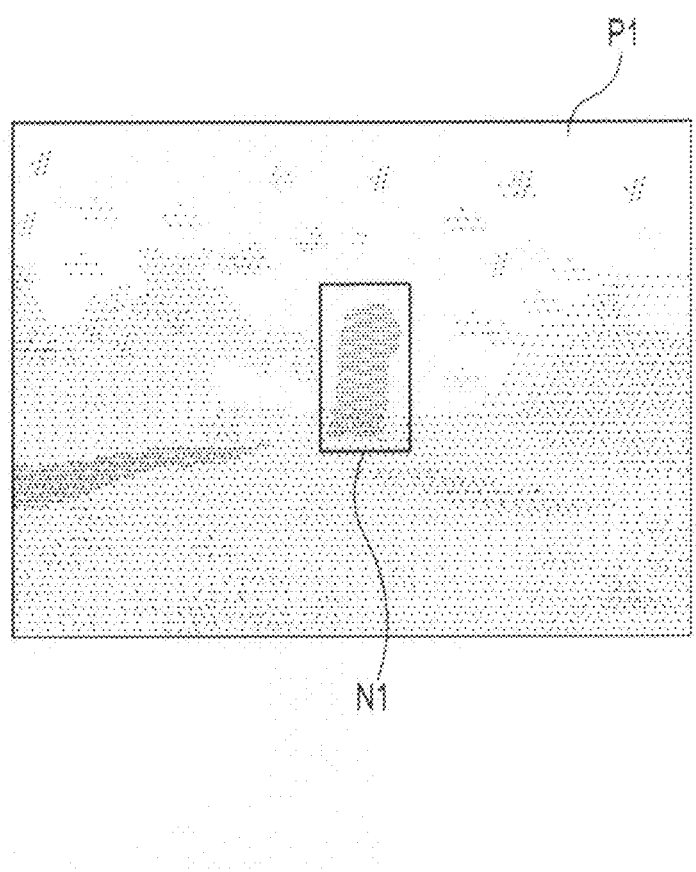
FIGS. 3A and 3B illustrate a process of controlling a first object area detector to decide an object-candidate area according to an embodiment of the present invention.
Figure 3B:
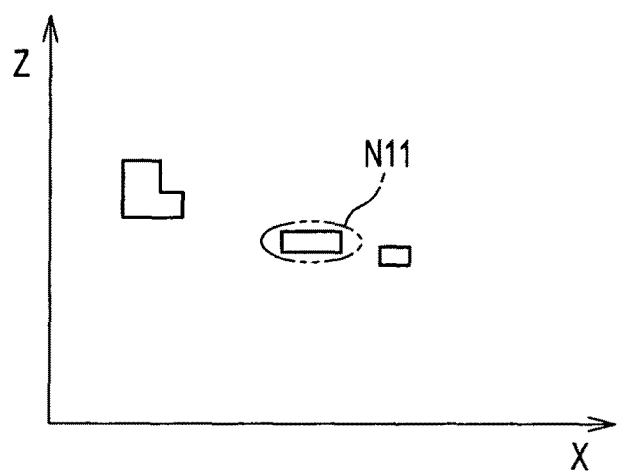

A photographed area P1 of FIG. 3A is formed when a 3D image is converted into a black-and-white image. The photographing area P1 includes a candidate object N1. The first object area detector constructs a map of distance information made of 3D distance data received from the camera 10. Distance distribution corresponding to a distance from the camera to the object appears on the distance-information map. The candidate object area is decided on the basis of this distance distribution. If the 3D distance data is not in use, the 3D distance data is projected so that the projected result is converted into 2D distance data. As a result, the candidate object area may be decided by the 2D distance data. As can be seen from FIG. 3B, distance data of three axes (X, Y, Z) is projected on one axis (Y), such that the projected result appears in a space of two axes (X, Z). In this case, the candidate object area (N11) of FIG. 3B may correspond to a candidate object N1 of the photographing image P1.

Secondly, a method of commanding the second object area detector 72 to determine a candidate object area is as follows. The second object area detector 72 extracts an area having both an edge and a closed curved surface from received image data, and stores the extracted area as a candidate object area. Detailed descriptions thereof will hereinafter be described.

Figure 4A:
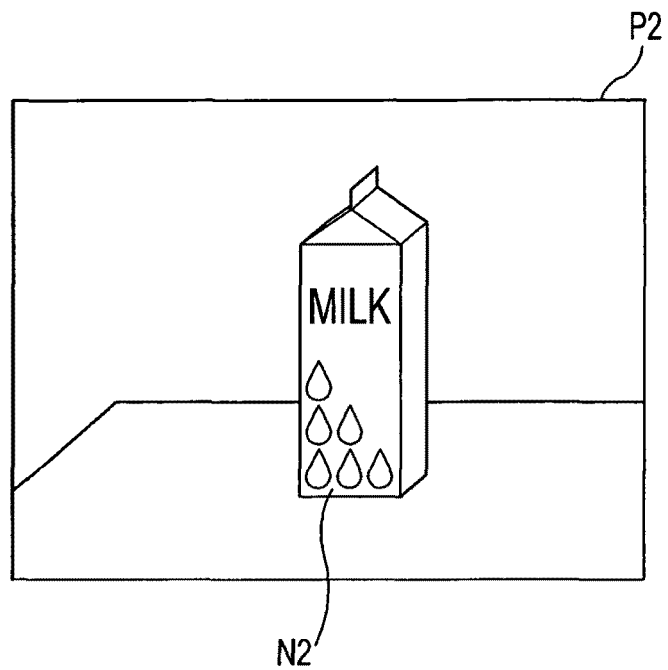
FIGS. 4A and 4B illustrate a process controlling a second object area detector to decide an object-candidate area according to an embodiment of the present invention.
Figure 4B:
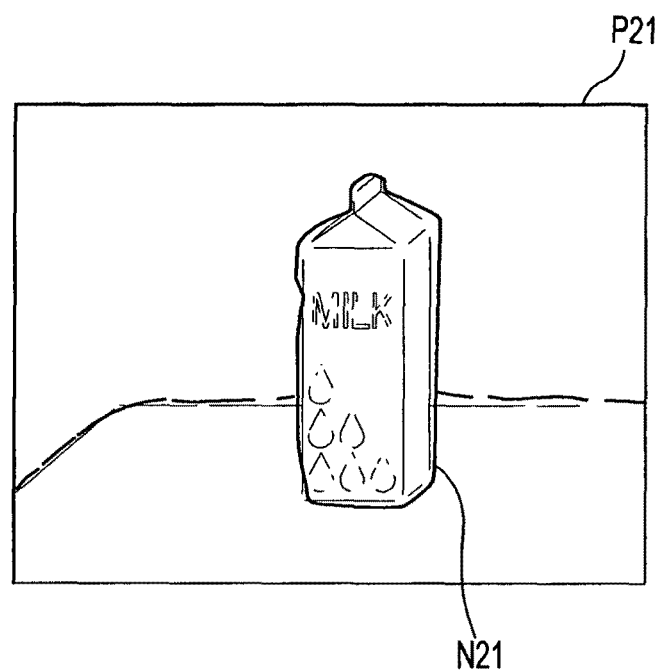

Referring to FIG. 4A, the photographed area P2 provided from the camera 10 includes a candidate object N2. The second object area detector 72 detects each of the edge and the closed curved surface from the photographing area P21 converted by an image processing algorithm, and determines a candidate object area N21 on the basis of the detected edge and closed curved surface.

Figure 5:
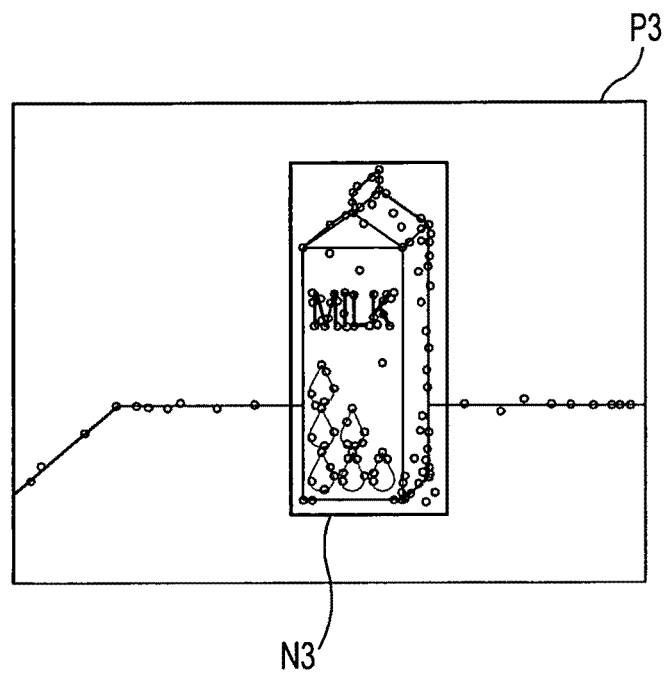
FIG. 5 illustrates a process controlling a third object area detector to decide an object-candidate area according to an embodiment of the present invention.

Third, a method of commanding the third object area detector 73 to determine a candidate object area is as follows. The third object area detector 73 determines positions or areas where characteristics will be extracted from an image, extracts characteristic vectors from the determined positions or areas, and stores an area in which the characteristic vectors are densely collected, as a candidate object area. As shown in FIG. 5, an image P3 converted by the third object area detector 73 includes a characteristic point, denoted by a small-sized circle, as a characteristic vector. The third object area detector 73 determines a candidate object area N3 according to a distribution of this characteristic point.

This embodiment shows an example in which the camera 10 for use in the present invention is a stereo camera. Provided that a mono camera is applied to this embodiment, this embodiment determines a candidate object area in only the second and third object area detector 72 or 73 simultaneously while excluding the first object area detector 71.

An overlap area from among the candidate object areas N11, N21, and N3 determined by the first to third object area detectors 71, 72, and 73 may appear in various types.

The object decision unit 74 assigns priorities according to the size of the overlap area of the candidate object areas determined by individual detectors. If any one of the priorities is decided, the object decision unit 74 determines the presence of the candidate object.

TABLE 1

| Overlap area among candidate object areas | Application condition | Priority |
|---|---|---|
| Overlap area of N11, N21, and N3: A1 | a1 < A1 < b1 | Priority 1 |
| Overlap area of N11 and N21: A2 | a2 < A2 < b2 | Priority 2_1 |
| Overlap area of N11 and N3: A3 | a3 < A3 < b3 | Priority 2_2 |
| Overlap area of N21 and N3: A4 | a4 < A4 < b4 | Priority 3 |

Although this embodiment has not illustrated that the object-presence decision unit 70 is able to selectively apply only some of all the priorities shown in Table 1, it should be noted that the above-mentioned application can be readily implemented by those skilled in the art.

A method of controlling a robot according to an embodiment of the present invention will hereinafter be described.

When operation of the robot begins, the camera 10 photographs a peripheral part of the robot. Data photographed by the camera 10 is stored in the data storage unit 20. In this case, if the stereo camera is used, this photographed data may include image data and distance data. The system controller applies a data calling command to the data storage unit 20 in operation 200.

According to this data calling command, data stored in the data storage unit 20 is transferred to the object recognizer 30 in operation 210. The object recognizer 30 extracts characteristics from the above data. The object recognizer 30 retrieves characteristic data of the registered object from the database (DB) 40. The object recognizer 30 compares the characteristic data extracted from the data with characteristics of the registered object. If the extracted characteristic data is equal to the characteristics of the registered object, the object recognizer 30 recognizes the name of the object in operation 220. Thus, the object recognizer 30 determines the presence or absence of the registered object (230) according to the recognized result. This determined result is provided to the system controller 50.

If the characteristics of the registered object are different from the extracted characteristic data, photographed data stored in the data storage unit 20 is transferred to the object-presence decision unit 70. A command to determine the presence of the candidate object by the object-presence decision unit 70 is generated from the system controller 50.

Figure 7:
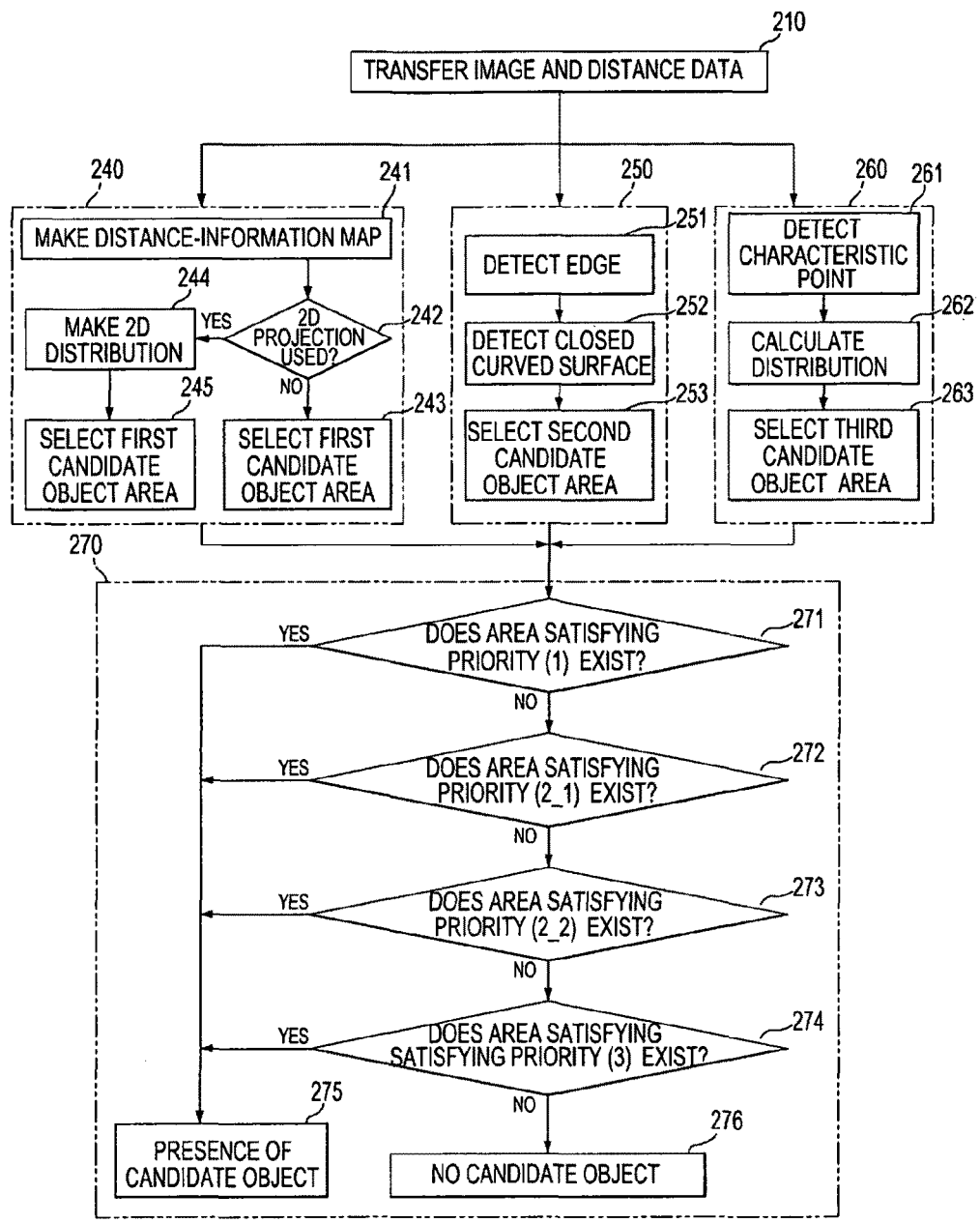
FIG. 7 is a flow chart illustrating a method of deciding the presence or absence of an object-candidate according to an embodiment of the present invention.

Referring to FIG. 7, the first to third object area detectors 71, 72 and 73 detect the candidate object area at operations 240, 250, and 260, respectively. The object-area decision unit 74 determines the presence of the candidate object in operation 270. A detailed description thereof will hereinafter be described.

The video data and distance data stored in the storage unit 20 are transferred to the individual detectors 71, 72, and 73. This distance data is 3D data in operation 210.

The first object area detector 71 makes a distance-information map (241) using 3D distance data. Then, if the 2D projection is not in used, the first object area detector 71 determines a first candidate object area according to a distance distribution on the distance-information map at operations 242 and 243. If the 2D projection is used, 3D distance data is converted into 2D distance data, and a first candidate object area is determined according to distance distribution of the changed 2D distance data at operations 244 and 245.

A second object area detector 72 detects the edge and the closed curved surface from the image data at operations 251 and 252, respectively. The second object area detector 72 decides a second candidate object area having characteristic data on the basis of the detected edge and closed curved surface in operation 253.

A third object area detector 73 determines a position and area where the characteristic data will be extracted from the image data, and detects a characteristic point as a characteristic vector from the determined position and area in operation 261. The third object area detector 73 calculates a distribution (262) of the detected characteristic point in operation 272, and determines a third candidate object area (263) according to the calculated characteristic point distribution in the overall operation 260.

In this way, the first to third object candidate areas are determined by the first to third detectors, respectively. The object-area decision unit 74 may determine the presence or absence of the candidate object according to the size of the overlap area among the candidate object areas decided by the detectors 71 to 73 in operation 270.

If there is a first area A1 in which the first to third candidate object areas overlap with one another, and this first area A1 satisfies an application condition (a1<A1<b1) (271), the presence of an area satisfying the priority (2_1) is decided in operation 272, such that the presence of the candidate object is determined in operation 275. If there is an overlap area A3 among the first to third candidate object areas, and this overlap area A3 satisfies an application condition (a3<A3<b3). The presence of an area satisfying the priority (2_2) is decided in operation 273, such that the presence of the candidate object is determined in operation 275. If there is an area A4 in which the second and third candidate object areas overlap with each other, and this area A4 satisfies an application condition (a4<A4<b4), the presence of an area satisfying the priority (3) is decided in operation 274, such that the presence of the candidate object is determined in operation 275.

If the candidate object areas decided by the individual detectors are not overlapped with each other, the absence of the candidate object is determined in operation 276.

Figure 6:
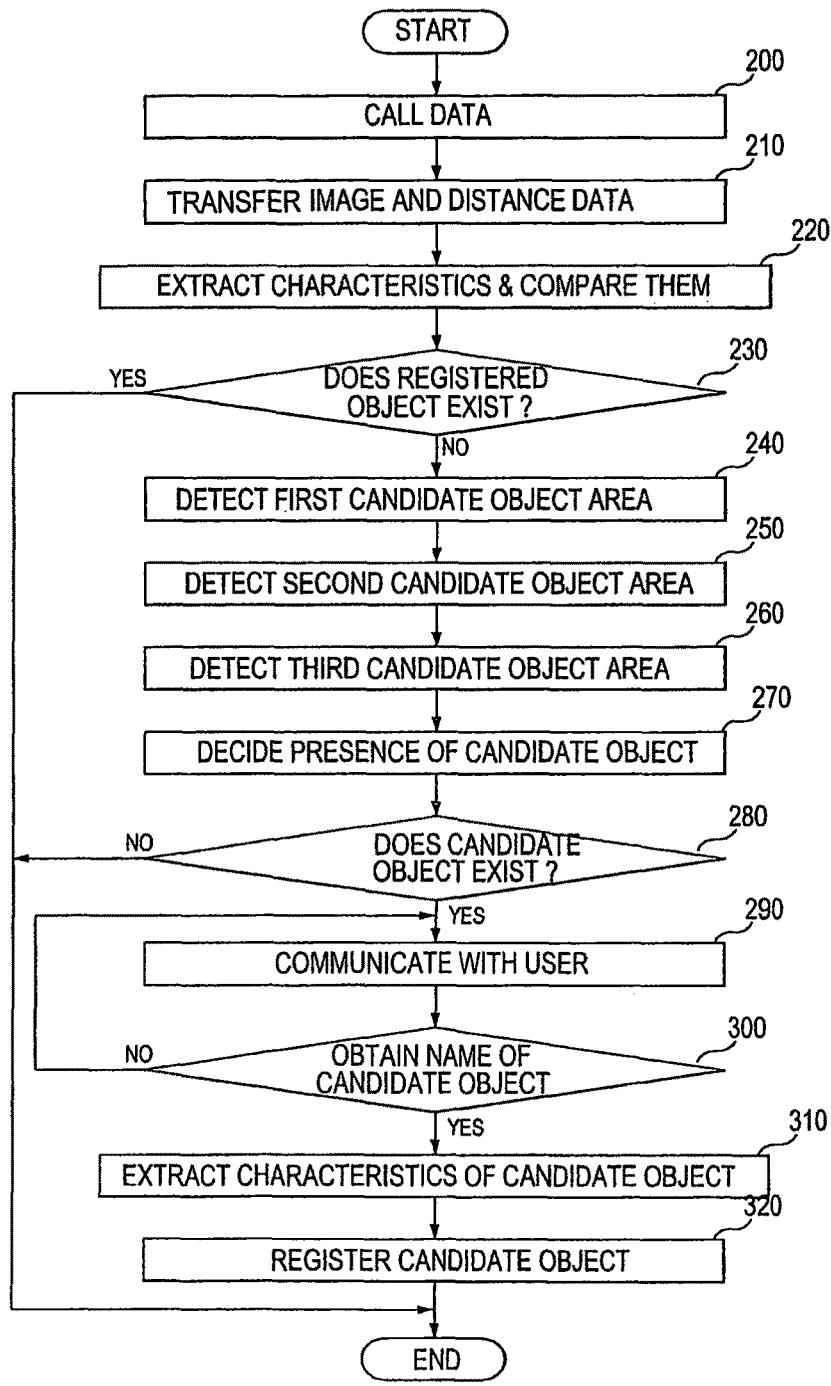
FIG. 6 is a flow chart illustrating a method of controlling a robot according to an embodiment of the present invention.

Referring back to FIG. 6, the object-presence decision unit 70 determines the presence or absence of the candidate object on the basis of the overlapping degree of the detected candidate object areas in operation 280. If the absence of the candidate object is decided, the program of FIG. 6 is finished without any change.

If the candidate object exists, the HRI controller 80 communicates with the user using the HRI module 90 in operation 290. In order to communicate with the user, the HRI controller 80 may use voice data or any movements.

The HRI controller 80 obtains a name of the candidate object by communicating with the user, and informs the system controller 80 of the obtained name in operation 300.

Then, the system controller 50 outputs an object registration command to the object registration unit 60, such that the object registration unit 60 extracts characteristic data of the candidate object in operation 310. Then, the object registration unit 60 adds characteristic and name data of the candidate object to the database (DB) 40, such that the registration of the non-registration object is finished in operation 320.

As is apparent from the above description, the embodiments of the present invention newly register an unknown object, and increase the capability of recognizing the object in proportion to the increasing number of recognition objects. Therefore, the embodiments of the present invention recognize a non-registration object present in an activity space of the robot, such that the robot can easily carry out a variety of given services.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A robot comprising:
an object-presence decision unit which determines a presence of a non-registered object in a photographing area;
a human robot interface (HRI) module which initiates communication with a user to obtain information on the non-registered object in response to determining the presence of the non-registered object; and
an object registration unit which registers the non-registered object in the robot on the basis of the information received from the user,
wherein the non-registered object is an object which does not have corresponding characteristic information previously stored in the robot.

2. The robot according to claim 1, further comprising:
a camera which provides photographed data of the photographing area, and
the object-presence decision unit provides image data and distance data obtained from the camera.

3. The robot according to claim 2, wherein the object-presence decision unit includes at least one object area detector, which determines a candidate object area where a candidate object may exist on the basis of the image data or the distance data.

4. The robot according to claim 3, further comprising a plurality of the object area detectors, wherein the object-presence decision unit includes an object-area decision unit, which determines the presence of the candidate object according to a size of an overlap area among the candidate object areas determined by the object area detectors.

5. The robot according to claim 4, wherein the object area detectors include at least one detector which detects a candidate object area according to a distance distribution appearing on the distance data and at least one detector which detects a candidate object area according to characteristics appearing on the image data.

6. The robot according to claim 5, wherein the at least one detector which detects the candidate object area on the basis of the distance data converts three-dimensional (3D) distance data into two-dimensional (2D) distance data.

7. The robot according to claim 5, wherein the at least one detector which detects the candidate object area on the basis of the image data determines a candidate object area on the basis of an edge and closed curved surface detected from the image data.

8. The robot according to claim 5, wherein the at least one detector which detects the candidate object on the basis of the image data decides a position and area where characteristic data will be extracted from the image data, and determines a candidate object area according to a density of a characteristic vector extracted from the decided position and area.

9. The robot according to claim 1, further comprising:
a database which stores at least one of a registered object and the non-registered object.

10. The robot according to claim 1, further comprising:
an HRI controller which provides a name of the non-registered object obtained from the user.

11. The robot according to claim 1, wherein the HRI module communicates with the user using voice or movement.

12. A method of controlling a robot comprising:
- determining, using a processor, a presence of a non-registered object in a photographing area;
- if the non-registered object is determined to be present in the photographing area, initiating a communication with a user, using a processor, to obtain information on the non-registered object; and
- registering, using a processor, the non-registered object in the robot on the basis of the information received from the user,
- wherein the non-registered object is an object which does not have corresponding characteristic information previously stored in the robot.

13. The method according to claim 12, wherein the determining of the presence of the non-registered object includes:
- determining a plurality of candidate object areas, each of the candidate object areas having a candidate object, on the basis of image data or distance data; and
- determining the presence of the candidate object according to a size of an overlap area from among the determined candidate object areas.

14. The method according to claim 13, further including:
- if the candidate object area is determined on the basis of the distance data, determining the candidate object areas according to distance distribution appearing on the distance data.

15. The method according to claim 13, further including:
- if the candidate object area is determined on the basis of the distance data, converting three-dimensional (3D) data into two-dimensional (2D) data.

16. The method according to claim 13, further including:
- if the candidate object area is determined on the basis of the image data, determining the candidate object area according to an edge and closed curved surface detected from the image data.

17. The method according to claim 13, further including:
- determining a position and area where characteristic data will be extracted from the image data, and determining a candidate object area according to a density of a characteristic vector extracted from the decided position and area.

18. The method according to claim 12, wherein the operation of communicating with the user comprises using voice or movement to acquire a name of the non-registered object.

19. The method according to claim 12, wherein the registering of the non-registered object comprises storing an object name and object characteristics obtained by the operation of communicating with the user in a database, such that the non-registered object is registered.

* * * * *